United States Patent Office.

ELOY NORIEGA, OF MEXICO, MEXICO.

REAGENT FOR WORKING GOLD OR SILVER ORES.

SPECIFICATION forming part of Letters Patent No. 547,674, dated October 8, 1895.

Application filed September 14, 1892. Serial No. 445,895. (No specimens.) Patented in England October 4, 1892, No. 17,661.

*To all whom it may concern:*

Be it known that I, ELOY NORIEGA, of Mexico, Mexico, have invented a new and useful Reagent for Working Gold and Silver Ores, (for which I have obtained a British patent, No. 17,661, dated October 4, 1892;) and I do hereby declare that the following is a full, clear, and exact description of the invention, which will enable others skilled in the art to which it appertains to make and use the same.

The object of my invention is to facilitate the operation of working gold and silver ores, (especially silver ores,) to reduce the time required to secure thorough amalgamation, and to effect a saving in mercury.

My improvements relate more particularly to what is known as the "chloridizing" process, wherein the object is to obtain the precious metal in the form of a chloride. I use as chloridizing agents ferrous chloride ($FeCl_2$) alone, or a mixture of ferrous chloride with cuprous chloride, ($Cu_2Cl_2$.) These reagents, while supplying chlorine, attack and dissolve but slightly, if at all, the mercury used in amalgamating. I prepare ferrous chloride ($FeCl_2$) by boiling or heating a solution of ferrous sulphate, ($FeSO_4$,) sodium chloride, ($NaCl$,) and sulphuric acid mixed with metallic iron. This I prefer to accomplish by subjecting the mixture to the action of steam until the resulting product is reduced and crystallized. This product will contain ferrous chloride and sulphate of sodium, ($Na_2SO_4$.) By substituting for the ferrous sulphate, cupric sulphate, ($CuSO_4$,) and for the metallic iron metallic copper, I obtain a product which, besides sulphate of sodium, contains the cuprous chloride.

The formation of ferrous chloride and cuprous chloride is represented by the following equations:

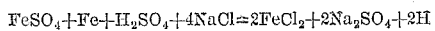

and

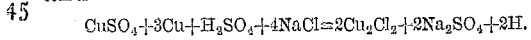

By mixing the copper and iron salts thus prepared after they have become crystallized, or using all the ingredients in the preparation of the reagent, I provide the mixed subchlorides of my invention; or I can mix the ores with cuprous chloride and then add the solution of ferrous chloride. The object of adding metallic iron and copper is to neutralize the excess of acid. The use of ferrous chloride saves expense in the process, as it is far cheaper than cuprous chloride. The advantage of the particular reagents containing sulphate of sodium resides in the action of said sulphate on ores containing pyrites, sulphate of bismuth, or analogous substances. The sulphate of sodium in such cases causes a separation of the alien metals, and thus leaves the chloride free to act on the sulphide of silver or gold.

It is not necessary to cause the ferrous chloride or the mixed ferrous and cuprous chlorides of my invention to do all the work. A preliminary chloridizing process may be applied, still leaving the partly-treated ore ready for the operation of my reagent. Where the two chlorides are used, they may be added in succession to the ore, their simultaneous addition not being essential to my invention.

Having thus described my invention, I claim as new and desire to secure by Letters Patent—

1. The herein-described method of manufacturing a re-agent for the treatment of argentiferous and other ores, which consists in combining a chloride, an acid, the sulphate of a metal, and the metal which forms the base of the said sulphate, the base of the chloride being stronger than that of the sulphate, substantially as described.

2. The herein described method of manufacturing a re-agent for the treatment of argentiferous and other ores, which consists in mixing a chloride, an acid, the sulphate of a metal, and the metal which forms the base of the said sulphate and subjecting the mixture to the action of steam until the resulting product is reduced and crystallized, the base of the chloride being stronger than that of the sulphate, substantially as described.

ELOY NORIEGA.

Witnesses:
JOSÉ GOYARZU,
FELICIANO MIGOYA.